United States Patent [19]

Norrie

[11] Patent Number: 4,838,036
[45] Date of Patent: Jun. 13, 1989

[54] CARCASS CONVEYOR FOR CHILLING CHAMBER

[75] Inventor: Lyle W. Norrie, Etobicoke, Canada

[73] Assignee: Knud Simonsen Industries Limited, Rexdale, Canada

[21] Appl. No.: 236,833

[22] Filed: Aug. 26, 1988

[51] Int. Cl.$^4$ ............................................. F25D 13/06
[52] U.S. Cl. ........................................ 62/63; 17/44.1; 198/465.4; 198/680
[58] Field of Search ................. 62/63, 374; 198/465.4, 198/680; 17/44.1

[56] References Cited

U.S. PATENT DOCUMENTS

| | | | |
|---|---|---|---|
| 2,868,354 | 1/1959 | Harrison | 198/465.4 |
| 3,164,967 | 1/1965 | Marshall | 62/63 |
| 3,298,500 | 1/1967 | Jensen | 198/680 |
| 3,416,186 | 12/1968 | Zebarth et al. | 198/680 |
| 3,680,173 | 8/1972 | Martin | 17/44.1 |
| 3,769,807 | 11/1973 | Foster | 62/63 |
| 4,062,440 | 12/1977 | Barry et al. | 198/465.4 |
| 4,367,630 | 1/1983 | Bernard et al. | 62/63 |
| 4,498,578 | 2/1985 | Altenpohl | 198/680 |

Primary Examiner—Ronald C. Capossela

[57] ABSTRACT

A product conveyor for a processing chamber in use in a meat processing facility, where meat products are carried through the facility on carriers, and the conveyor for the processing chamber having trolleys with hooks, which engage the carriers carrying the products and lift the carriers off the carrier rail from the other facilities in the plant, and carry them through the processing chamber and then lower then down onto a further carrier rail for movement through the remainder of the facility, the hooks disengaging from the carriers which are then free to move.

9 Claims, 4 Drawing Sheets

CARCASS CONVEYOR FOR CHILLING CHAMBER

The invention relates to a conveyor assembly for a processing chamber, and in particular to such a conveyor assembly for conveying products such as carcasses, meat sections, and other meat products to a processing chamber, and through it, and from it, and to a method of operation of such a conveyor.

BACKGROUND OF THE INVENTION

In a meat processing plant, various different processing operations are carried on at various different locations. For example animals are killed in one location, washed and cleaned in another and may be dressed in a third, and may be chilled either as whole carcasses, or as dressed meat sections, or may be cooked or smoked and may be packaged.

In the majority of meat processing plants, the products, e.g. meat sections and the like, and carcasses, are carried on a single conveyor, being hung by gambrels, chains, or hangers from trolleys running on the conveyor. For various reasons, it may considerably facilitate the operation if it is possible to transfer the products from one conveyor to another for a specific processing operation. In this way it is possible to provide a conveyor designed specifically for that processing location, which does not extend through the rest of the plant. A transfer station is provided where products can be loaded onto the processign chamber conveyer at the entrance to the processing chamber, and dropped off the conveyor for transfer to another location in the plant, at the exit from the processing chamber.

Advantageously this will be carried out without disturbing the attachment of the product to the gambrel, chain, or hanger.

For example, in the butchering of hogs, it is advantageous if the hog carcass is chilled, after hanging and dressing, and prior to further processing. A rapid chilling of the carcass results in better quality meat and less shrinkage. Accordingly it has become the practice to convey carcasses from the dressing area or kill floor through a chilling room, so as to produce a predetermined dwell time in the chilling room, and then to convey them for further processing in other facilities.

In the great majority of slaughter houses, the conveying system for conveying carcasses consists of a single carrier rail, and wheeled carriers riding freely on the carrier rail. Hooks or gambrels are used to attach the carcasses to the carriers. Typically this carrier rail is a plain bar of steel about 12.0 mm wide. The carriers employ a single wheel, grooved to receive the rail. The wheels are mounted in a yoke-like frame and a lubricant or grease is used to lubricate the wheel bearings. In order to move the carriers along the carrier rail, a conveyor rail is mounted usually above the carrier rail. On the conveyor rail, there are a series of trolleys linked together by a continuous chain. Normally there will be some form of fingers or pushers at spaced intervals along the chain, usually one to each of the conveyor trolleys, for pushing the carriers. One particularly adaptable form of conveyor rail is an I-beam, with conveyor trolleys runnig on the I-beam, and connected by a chain.

In the past it has been the practice to use this type of carrier rail, and conveyor rail, to extend completely through the kill floor and other locations and through the chill room, for conveying the carcasses into, and through and out of the various processing locations or chambers. Certain difficulties have however been experienced using this system. In the chilling chamber in order to procure an adequate degree of chilling, it is desirable to maintain a low temperature, accompanied by rapid air circulation. However, in such a reduced temperature the lubricant or grease used to lubricate the carrier wheel bearings solidifies. When this happens the wheels freeze on their axles and will no longer rotate. The carrier are then simply dragged along with their wheels skidding on the carrier rail throughout the length of the chill room. This, in turn, causes rapid wear of the carrier rail and carriers, and also puts an excessive strain on the conveyor chain and drive motor.

One solution to the problem has been to use a low-temperature lubricant for the carrier wheel bearings. While this overcomes the problem in the chill room itself, it also leads to other problems. Thus when the carriers are not in the chill room, they are located either in the kill floor or some other facility, where the air may be at plant ambient temperature in the region of 68 to 85 degrees Farenheit. At these temperatures the low-temperature lubricants become liquid, and as the carrier wheels rotate, the lubricant drips out and soils the carcass. This then requires a further washing or meat trimming step, and some of such lubricants are difficult to remove in a satisfactory manner.

Other problems may arise in other locations or processing chambers in such plants, where products such as carcasses, meat sections, and cooked or smoked meats and sausage, are processed.

Accordingly, it is desirable to provide for a form of conveyor in the processing chamber which overcomes problems such as lubrication, without interfering with the carrier system as used throughout the remainder of the plant, and without involving the handling of the products.

BRIEF SUMMARY OF THE INVENTION

With a view to overcoming the various problems noted above, the invention comprises a product conveyor adapted to be installed in a processing chamber, said chamber having an entrance and an exit, and comprising a continuous loop conveyor running through said chamber, and defining a pick-up point at said entrance and a drop-off point at said exit, said pick-up and drop-off points defining a predetermined height, a delivery carrier rail at said pick-up point, located a predetermined distance below said processing conveyor, a receiving carrier rail at said drop-off point, located a predetermined distance below said processing conveyor, a plurality of trolleys on said processing conveyor with roller means on said trolleys adapted for use in said processing chamber, linkage means interconnecting said trolleys, power-operated means for moving said trolleys in unison along said processing conveyor, a plurality of product carriers on said delivery carrier rail having carrier wheels riding on said rail, engagement means on an upper portion of said product carriers, hook means on said trolleys interengageable with said engagement means of said product carriers whereby to remove said product carriers out of engagement with said carrier rail, control means at said pick-up point, for controlling the movement of said product carriers on said delivery carrier rail, whereby to synchronize with movement of said trolleys on said processing chamber, release means at said drop-off point engageable with respective said hooks, and operable to disengage a said hook from a respective said carcass carrier engagement means, whereby to place said carriers onto said receiving carrier rail.

The invention further provides a method of processing products in a processing chamber between a first facility, and a second facility, said products being carried on wheeled carriers riding on a carrier rail in said first facility and comprising the steps of delivering said products on said carriers riding on said first facility carrier rail to a processing chamber at a pick-up point at a predetermined first height, moving a plurality of process chamber trolleys along a processing chamber conveyor rail at a predetermined second height, said trolleys having wheel means adapted for operation in said processing chamber whereby to move said trolleys in sequence over said pick-up point, at an elevation above said carriers on said first facility carrier rail, causing suspension means on said trolleys to move downwardly at an angle and to engage respective said carriers, and moving the same off said first facility carrier rail, and moving same upwardly at an angle; continuously moving said processing chamber trolleys along said processing room conveyor rail through said processing chamber with respective carriers suspended therefrom, whereby to procure a predetermined dwell time of said products in said processing chamber, and thereafter delivering same to a drop-off point; transporting said carriers, on said trolleys downwardly into engagement with carrier rail means for said second facility at said drop-off point; disengaging said suspension means from said carriers, thereby releasing said carriers for movement along said second facility carrier rail means independent of said trolleys; and, moving said trolleys upwardly away from said drop-off point.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

As explained above, the invention may be applicable in various locations in a product processing plant, for use in a particular processing facility, where it is desired to provide a conveyor having special characteristics suitable for that facility. One particularly advantageous use of the invention, as described above, is in connection with the provision of conveyor means in a chamber for chilling products, such as carcasses, which will be described herein as a chiller room.

Figure 1:
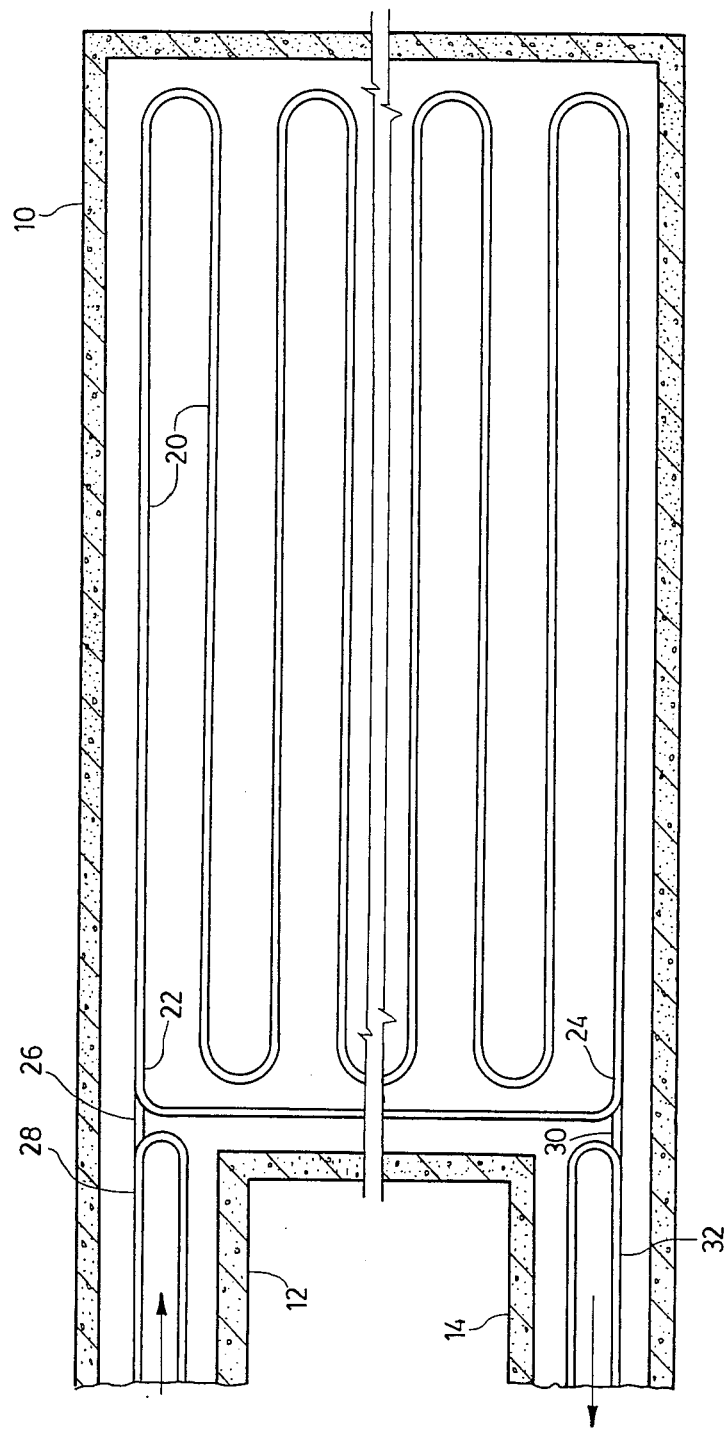
FIG. 1 is a schematic plan view of a processing chamber, showing a simplified form of layout for the processing conveyor.

Turning first of all to FIG. 1, a simplified form of chiller room is indicated generally as 10. This is shown to be of rectangular shape, having an entrance 12 and an exit 14. The details of the insulation in the walls, the air circulation, refrigeration evaporator coil units, controls and piping, and the like, are all omitted for the sake of clarity.

The chill room or chiller 10 is located in the meat packing plant, between a first facility, in this case typically a kill floor, and a second facility, typically a cutting room.

An equilibrating cooler may often be located between the chill room 10 and the cutting room. It will be appreciated that the invention may also be applicable to other locations in a processing plant, between other facilities, and to products other than carcasses.

As described above, dressed carcasses are passed through the chiller 10 prior to being delivered to the equilibrating cooler and/or then to the cutting room. It is found that by causing the dressed carcasses to dwell in the chiller for a period of time, that the carcasses are chilled to a sufficient degree to obtain a shrink of less than 0.3% of carcass weight and after equilibrating for at least six (6) hours produced a carcass with an internal temperature throughout of 3 to 6 degrees C. This degree of chilling is sufficient to chill the fat and muscle of the carcass in such a manner that it both improves its appearance and yield, resists shrinkage, and also facilitates cutting.

The chiller 10 is provided with a chiller conveyor indicated generally as 20, which is arranged in a series of parallel runs, linked around 180 degree turns at each end. The use of such parallel runs of the conveyor will, of course, depend upon the design of the plant, and the parallel rails illustrated in FIG. 1 are merely by way of example.

At the entry 12, conveyor 20 defines a pick-up point 22. At exit 14 conveyor 20 defines a drop-off point 24.

It will be appreciated that since the atmosphere within the chiller 10 is at a low temperature, and since the atmosphere on the first facility, e.g., the kill floor where men are working will be at normal plant ambient temperature, and that the temperature in the second facility, e.g., the equilibrating cooler and/or cutting floor, will be higher than in the chiller, some form of barrier means will be provided at the entry and exit 12 and 14, such as an air curtain, or moveable doors, flexible plastic curtains or the like, which are not shown, and which are in any event well known in the art.

Also shown in FIG. 1 in somewhat schematic form are the first facility carrier rail 26, with a notch 27, which extends from the first facility, e.g., the kill floor, and also the first facility conveyor 28. The conveyor 28 is shown in the form of a loop, whereas the carrier rail 26 is a single rail, for reasons described below.

Again referring to FIG. 1, at the exit 14, the second facility carrier rail 30 with a notch 31 (FIG. 3) is illustrated, together with the second facility conveyor 32.

As noted above, in this discussion, for the sake of example, the first facility is referred to as a kill floor, and the second facility is referred to as an equilibrating cooler and/or a cutting floor, and the products in this case are carcasses, but the invention is not limited thereto.

Figure 2:
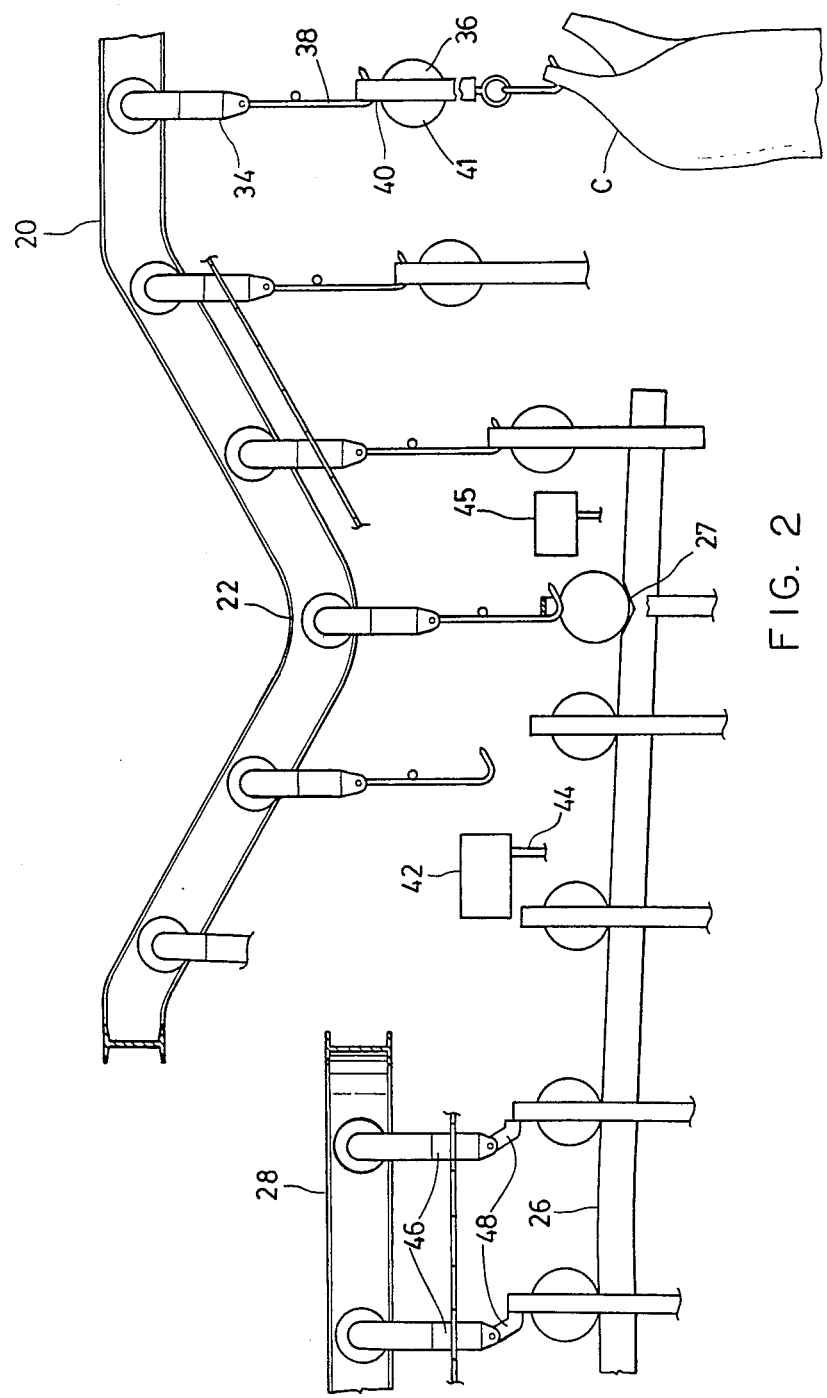
FIG. 2 is a schematic section along the line 2—2 of FIG. 1, showing the pick-up point of the processing conveyor in elevation.

Referring now to FIG. 2, the pick-up point 22 of the chiller conveyor 20 is illustrated, in somewhat schematic form. It will be seen that the chiller conveyor 20 is located at a predetermined height above the kill floor carrier rail 26 for reasons to be described, and the pick up point 22 is somewhat lower than the remainder of conveyor 20. A series of trolleys 34 are located on the conveyor 20. A series of carcass carriers 36 are located on the carrier rail 26.

Each of the trolleys 34 has a downwardly-dependent hook member 38. Each of the carriers 36 has an upwardly-extending engagement yoke 40 and a grooved wheel 41 riding on rail 26. Wheels 41 typically have bearings lubricated with a lubricant suitable for operation at a normal plant ambient temperature. Products, in this case carcasses indicated generally as C, are shown suspended from the carriers 36.

An indexing mechanism 42 is provided, typically being attached to the carrier rail 26, and having an indexing arm illustrated schematically as 44. The arm 44 is moveable between a blocking and a releasing position. In the blocking position, carriers 36 are held on rail 26 and cannot move. In the releasing position, a single carrier 36 may move along rail 26 to notch 27, and be picked up by a hook 38 on a trolley 34 while any remaining carriers are held back. It will be appreciated that the rail 26 will be located at a slight incline, so that a carrier 36 is free to roll as soon as it is released by the arm 44. In this way, carriers 36 can move only one at a time, and at predetermined spaced intervals, along the rail 26.

It will also be noted that the kill floor conveyor 28 has trolleys 46, with downwardly-dependent pushers 48. The pushers 48 engage the yokes 40 of the carriers 36 by simply abutting against them, for pushing them along the rail 26. Thus, when the conveyor trolley 46 and carrier 36 reach the loop illustrated in FIG. 1, the carrier 36 will move along the rail 26, and the trolley 46 will return around the loop. In this way the carrier 36 is free to be picked up by the hook 38 of the trolley 34.

An essentially similar procedure takes place in reverse at the exit 14.

A second indexing device 45 may be provided as an extra safety measure adjacent the free end of rail 26.

Figure 4:
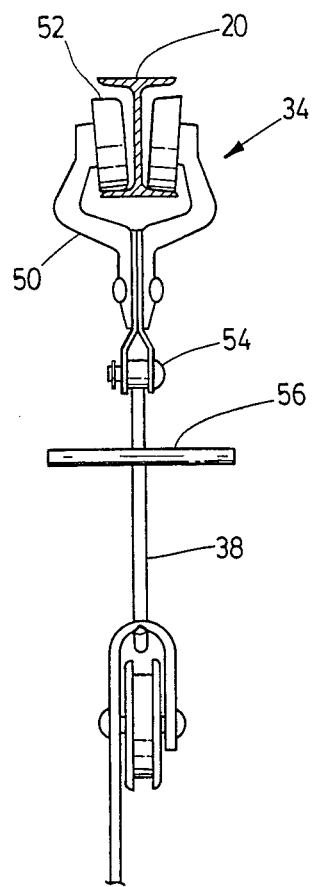
Figure 5:
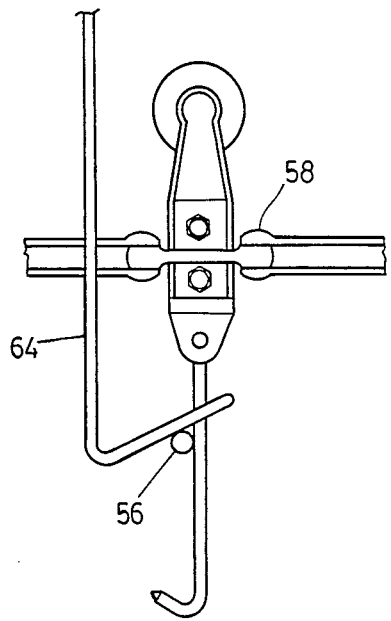
FIG. 5 is a side elevational view of the trolley of FIG. 4.

Referring now to FIG. 4, the trolleys 34 and hooks 38 of the chiller conveyor 20 are illustrated in more detail. They will be seen to comprise a generally U-shaped frame member 50, having two rollers 52 mounted thereon. Rollers 52 are especially designed for use in low temperature conditions, having sealed bearings (not shown) which are lubricated in a suitable manner for free running in the cold atmosphere of the chiller room.

The hook 38 is attached to a downwardly-dependent portion of the U-shaped member 50, and is pivotted by means of a pivot pin 54. A cross bar 56 is fastened transversely on the shaft of the hook 38 for reasons to be described below.

The trolleys 34 are connected by means of a continuous linkage in the form of a chain 58. Chain 58 is, in turn, driven by any suitable power-operated means (not shown) such as is well known in the art.

Figure 3:
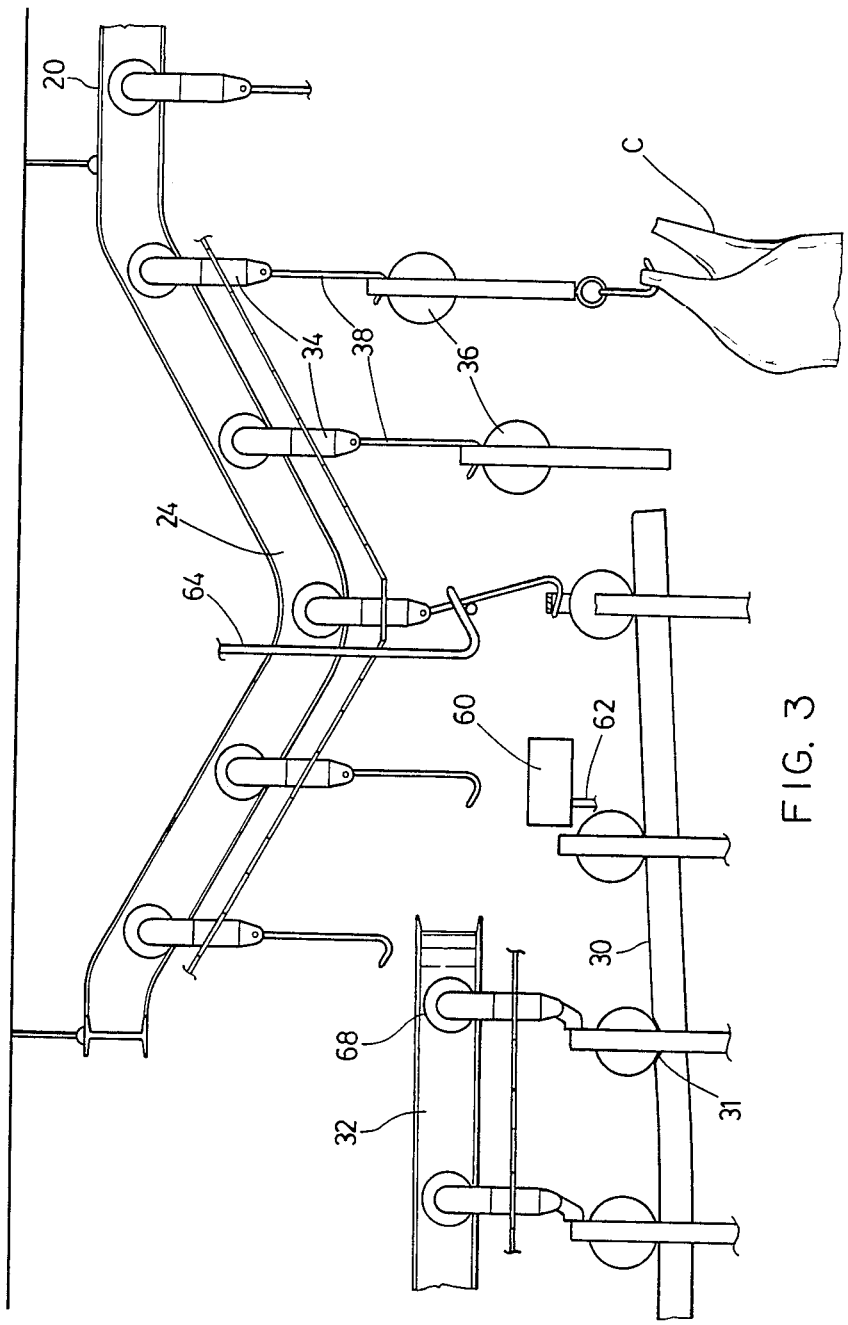
FIG. 3 is a schematic section along the line 3-3 of FIG. 1, showing the drop-off point of the processing conveyor in elevation; and, FIG. 4 is a greatly enlarged front elevational view of the processing chamber trolleys.

The exit 14 and the drop-off point 24 are illustrated in FIG. 3. It will be seen that the conveyor 20 is located a predetermined height above carrier rail 30, and drop-off point 24 is somewhat lower than conveyor 20.

An indexing device 60 with an indexing arm 62 is located adjacent carrier rail 30, for regulating the movement of carriers 36 along rail 30.

A hook releasing bracket 64 is mounted, typically on rail 20 at drop-off point 24. Bracket 64 has an angled ramp portion 66. Ramp portion 66 is positioned so as to engage the cross bar 56 on the hook 38. In this way, when the hook passes by the ramp portion 66, the hook is swung out of engagement with its carrier 36, thereby freeing the carrier 36. The rail 30 will usually have a slight incline, so as to facilitate free movement of the carriers 36, out of the exit 14 and into the equilibrating cooler and/or the cutting room.

Each carrier will be momentarily halted at notch 31, until it is engaged by a pusher 68 on conveyor 32.

In operation, the products, e.g. carcasses are moved along the kill floor rail 26, suspended from carriers 36. Conveyor 28 operates trolleys 46 and pushers 48 to simply push the carriers 36 along rail 26. As it leaves the kill floor, a carrier 36 engages the indexing arm 44. As the next chiller trolley 34 on conveyor 20 approaches pick-up point 22, it operates the indexing device 42 causing the arm 44 to move into its disengaged position. This will allow the carrier 36 to roll past the arm 44. Carrier 36 will then roll to notch 27 and stop. It is then in position to be engaged by hook 38 of trolley 34. Hook 38 will engage the engagement portion of yoke 40 of carrier 36, and lift it off rail 26. Rail 26 ends, and thus carrier 36 is simply suspended by hook 38 directly from trolley 34. The wheel 41 of carrier 36 is no longer engaging a rail and thus does not have to rotate in the cold atmosphere of chiller room 10.

Throughout the chiller room 10, the carcass C is moved suspended on the trolley 34, and is chilled to a predetermined desired temperature, dependent upon the temperature of the chill room, and the dwell time of the carcass in the chill room, and it is then delivered to the drop-off point 24.

At this point, trolley 34 will bring the carrier 36 down into engagement with the free end of the second facility carrier rail 30, and the carrier 36 will then ride on the rail 30. As the carrier 36 moves further along the rail 30, under the influence of trolley 34, the cross member 56 of hook 38 will engage the ramp portion 66 of bar 64, and hook 38 will swing rearwardly. This will bring the hook 38 clear of the engagement portion 40 of the carrier 36. The carriers 36 will then be free to roll along the rail 30, subject to the operation of arm 62, which indexes the carriers. As each carrier 36 moves under the conveyor 32, it will be engaged by a pusher 68, and simply be pushed along rail 30, with the weight of the carcass once again being carried on its carrier wheel, riding on rail 30.

It will thus be seen that for virtually the entire dwell time of the carcass in the chiller room 10, the wheel 41 of carrier 36 is not in engagement with any rail and thus does not have to roll, and thus does not experience the problems involved in earlier systems.

In a typical case, the chill room will be at a temperature between minus 25 and minus 40 degrees F. The dwell time for carcasses, in the case of hog carcasses, will typically be between 40 and 120 minutes.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A product conveyor for use in a processing chamber, said chamber having an entrance from and an exit to, other facilities, and comprising:

a continuous loop processing conveyor running through said chamber, and defining a pick-up point at said entrance and a drop-off point at said exit, said pick-up and drop-off points defining a predetermined height;

a delivery carrier rail at said pick-up point, located a predetermined distance below said processing conveyor;

a receiving carrier rail at said drop-off point, located a predetermined distance below said processing conveyor;

a plurality of trolleys on said processing conveyor with roller means on said processing trolleys adapted for use in said processing chamber;

linkage means interconnecting said trolleys;

power-operated means for moving said trolleys in unison along said processing conveyor;

a plurality of product carriers on said delivery carrier rail having carrier wheels riding on said rail;

engagement means on an upper portion of said product carriers;

hook means on said trolleys interengageable with said engagement means of said product carriers whereby to remove said product carriers out of engagement with said carrier rail;

control means at said pick-up point, for controlling the movement of said product carriers on said delivery carrier rail, whereby to synchronize with movement of said trolleys on said processing, conveyor, and release means at said drop-off point engagable with respective said hooks, and operable to disengage a said hook from a respective said product carrier engagement means, whereby to place said carriers onto said receiving carrier rail.

2. A product conveyor as claimed in claim 1 wherein said processing conveyor runs at a predetermined height through said chamber, and wherein said pick-up point defined by said processing conveyor is at a reduced height relative to the remainder of said conveyor, and wherein said drop off point defined by said conveyor is at a reduced height compared to the remainder of said conveyor, whereby at said pick-up point, a said carrier on said delivery carrier rail is engaged and raised upwardly, and at said drop-off point, a said carrier is lowered downwardly onto said receiving carrier rail.

3. A product conveyor as claimed in claim 2 including downwardly dependent hook means on each said trolley, for engaging respective said carriers, and including transverse arm means on each said hook, and ramp means at said drop-off point, adapted to engage said transverse arm means and swing said hook momentarily rearwardly, thereby disengaging same from said carrier.

4. A product conveyor as claimed in claim 3 wherein said delivery carrier rail at said pick-up point is angled downwardly to procure a movement of respective said carriers therealong towards said pick-up point, and wherein said delivery carrier rail at said drop-off point is angled downwardly, whereby to cause respective said carriers to move therealong away from said drop-off point.

5. A product carrier as claimed in claim 4 wherein said processing chamber is a chiller room, and wherein the atmosphere in said room is at freezing temperatures, and wherein said trolleys and said trolley roller means, are designed for operation at said temperatures.

6. A product conveyor as claimed in claim 1, wherein said chamber is a refrigerator chamber, wherein the atmosphere is at a reduced temperture compared to plant ambient temperature, and wherein said carrier wheels on said product carriers are lubricated for operation under plant ambient conditions, and wherein said trolleys are adapted for operation in said refrigerator chamber atmosphere.

7. A method of processing products leaving a first facility, and prior to entry into a second facility, said products being carried on wheeled carriers riding on a carrier rail in said first facility at plant ambient conditions and comprising the steps of:

delivering said products on said carriers riding on said first facility carrier rail to a chiller room pick-up point at a predetermined first height;

moving a plurality of processing trolleys along a processing conveyor rail at a predetermined second height, said trolleys having wheel means adapted for operation in conditions different from plant ambient condition whereby to move said processing trolleys in sequence over said pick-up point, at an elevation above said carriers on said first facility carrier rail;

causing suspension means on said trolleys to move downwardly at an angle and to engage respective said carriers, and moving the same off said first facility carrier rail, and moving same upwardly at an angle;

continuously moving said processig trolleys along said processing conveyor rail with respective carriers suspended therefrom, whereby to procure a predetermined dwell time of said products in said processing condition, and thereafter delivering same to a drop-off point;

transporting said carriers, on said processing trolleys downwardly into engagement with carrier rail means for said second facility at said drop-off point;

disengaging said suspension means from said carriers, thereby releasing said carriers for movement along said second facility carrier rail means independent of said processing trolleys; and, moving said trolleys upwardly away from said drop off point.

8. A method of processing products as claimed in claim 7, including the steps of disengaging said suspension from siad carriers, by bringing a transverse finger portion of each said suspension means into engagement with stop means, while simultaneously causing said carrier to roll downwardly along an angled portion of said second facility carrier rail means, and thereafter releasing said transverse finger portion from said stop means.

9. A method of processing products as claimed in claim 8 wherein said first and second facilities have atmospheric conditions at plant ambient temperature, and wherein said processing is carried on in a refrigerator room having an atmosphere at a reduced temperature, and wherein, the movement of said product carriers within said refrigerator room by said processing trolleys is carried out without rotation of said carrier wheels.

* * * * *